(12) United States Patent
Yan (10) Patent No.: US 7,780,411 B2
(45) Date of Patent: Aug. 24, 2010

(54) DEVICE AND METHOD FOR ADJUSTING ANGLE-OF-ATTACK OF WIND BLADES IN LIFT-TYPE VERTICAL AXIS WIND TURBINE

(76) Inventor: Qiang Yan, Rm 213, No. 243, Tao Pu Rd., Pu Tuo District, Shanghai (CN) 200333

(*) Notice: Subject to any disclaimer, the term of this patent is extended or adjusted under 35 U.S.C. 154(b) by 168 days.

(21) Appl. No.: 12/192,298

(22) Filed: Aug. 15, 2008

(65) Prior Publication Data
US 2009/0016884 A1 Jan. 15, 2009

Related U.S. Application Data

(63) Continuation of application No. PCT/CN2007/000458, filed on Feb. 9, 2007.

(30) Foreign Application Priority Data
Feb. 15, 2006 (CN) .......................... 2006 1 0023892

(51) Int. Cl.
*F03D 3/00* (2006.01)
*F03D 1/06* (2006.01)
*F03D 7/06* (2006.01)

(52) U.S. Cl. .................... 416/1; 416/110; 416/120; 416/132 B; 416/147; 415/1; 415/4.2; 415/4.4; 415/60; 415/907

(58) Field of Classification Search .................. 415/1, 415/4.2, 4.4, 60, 130, 907; 416/1, 110, 120, 416/147, 132 B; 290/44, 55
See application file for complete search history.

(56) References Cited

U.S. PATENT DOCUMENTS

| 4,247,251 | A | * | 1/1981 | Wuenscher | 416/24 |
|---|---|---|---|---|---|
| 4,380,417 | A | * | 4/1983 | Fork | 416/108 |
| 4,383,801 | A | * | 5/1983 | Pryor | 416/17 |
| 4,507,049 | A | * | 3/1985 | Strandgren | 416/51 |
| 5,503,525 | A | * | 4/1996 | Brown et al. | 416/24 |
| 7,083,382 | B2 | * | 8/2006 | Ursua | 416/110 |

* cited by examiner

*Primary Examiner*—Igor Kershteyn
(74) *Attorney, Agent, or Firm*—Matthias Scholl P.C.; Matthias Scholl (57) ABSTRACT

A device for adjusting an angle-of-attack (δ) of blades in a lift-type vertical axis turbine comprising a vertical rotating axis, a rotatable cantilever support wing fixed on the vertical rotating axis, a wind rotor comprising a plurality of blades mounted on the cantilever support wing, at least one cam disposed along an axial direction of the vertical rotating axis, the axial direction of the cam being parallel to the rotating axis, and for any point in a contour line of the cam, the angle of attack δ being set according to the following formula: δ=β−α, wherein δ is the angle of attack; β is an azimuth angle; α is a rotating angle for blades; and δ, β, and α are preset values.

4 Claims, 5 Drawing Sheets

A point

DEVICE AND METHOD FOR ADJUSTING ANGLE-OF-ATTACK OF WIND BLADES IN LIFT-TYPE VERTICAL AXIS WIND TURBINE

CROSS-REFERENCE TO RELATED APPLICATIONS

This application is a continuation of International Patent Application No. PCT/CN2007/000458, with an international filing date of Feb. 9, 2007, designating the United States, now pending, which is based on Chinese Patent Application No. 200610023892.2, filed Feb. 15, 2006. The contents of all of these specifications are incorporated herein by reference.

BACKGROUND OF THE INVENTION

1. Field of the Invention

This invention relates to vertical axis wind turbine and in particular, refers to a device and method for adjusting angle-of-attack of blades which can effectively lower the starting wind speed and increase the wind energy utilization ratio.

2. Description of the Related Art

In order to make better use of wind energy, various wind generating devices of different structure and form have been developed for a long time. Depending on the position of the rotating axis, wind turbines are divided into horizontal axis wind turbines (HAWT) and vertical axis wind turbines (VAWT). Vertical axis wind turbines can be divided into lift-type and drag-type. The characteristics of lift-type and drag-type rotors are explained, for example, in "Wind Energy and its Utilization" (Energy Publishing House, February 1984, pp. 81-85." Though both lift-type and drag-type rotors are vertical axis rotors, the principles behind rotation of the driving rotor are completely different and the effects are also different.

"Lift type" means that when wind blows over the surface of a blade, the wind speeds for blade's outer and inner surfaces are different due to blade's shape and angle of attack. A difference in wind speed is generated for blade's outer and inner surfaces. According to fluid mechanics, when the fluid speeds for inner and outer surfaces are different, a pressure difference is generated between two surfaces, i.e., lift force. When the blades are installed with a specific angle of installation (angle of attack) at different positions, this pressure difference (lift force overcomes drag force) will produce a driving moment around rotor's centre of gyration, which drives the rotor to rotate.

But when the rotor rotates, because the blade's azimuth angle constantly changes, the blade's angle of attack changes accordingly; at the same time, the relative speed between the blade and the wind also constantly changes, resulting in the change of the relative rotating angle between the blade and the wind. Therefore, the size and direction of the driving moment produced by the blades change at all times.

For a lift-type vertical rotor, the direction and size of the driving moment of the blades in the dissymmetrical rear half of the circumference are opposite to those in the front half of the circumference, and there is a large difference between their absolute values. "Positive work" is done in the front half of the circumference, while "negative work" is done in the rear half of the circumference. But because the wind flowing through the front half circumference is "cut" by the blades disposed on front half circumference, the wind speed is lowered. Because wind's energy is proportionate to the cube of wind speed, the absolute value of the driving moment received by the blades in rotor's rear half of the circumference is far below the driving moment received by the blades in front half circumference, thus making the rotor rotate. The higher the rotor's rotational speed, the bigger the wind speed difference and the bigger the power difference between the front and the rear half circumferences. Thus, the efficiency of lift-type rotor increases with the increase of rotor's rotational speed.

The drag-type vertical axis rotor has an essential difference from the lift-type rotor. The blade shape for drag-type rotor is different from that for lift-type rotor. Simply speaking, the blade of drag-type rotor can be a door plate. The drag coefficients on both sides of the blade are different; the side with a bigger drag coefficient obtains a bigger wind pressure. Wind pressure difference still makes the rotor rotate, but because drag-type rotor uses the component of wind's force vertical to wing surface, "positive work" is performed in the rotor's right half circumference, while "negative work" is done in rotor's left half circumference. Because the wind speeds at left and right sides are the same and the difference only lies in the drag coefficients on both sides of the blade, the work done in left and right half circumferences is the function of blade's drag coefficient times the cube of the blade's relative wind speed. If the wind speed is V and the linear speed of the rotor rotation is u: in right half circumference, because wind "drives" blade to move, the relative linear speed of the blade is lowered (V−u); and in left half circumference, because the blade moves upwind, the relative linear speed (V+u) is higher than that for the right half circumference. Therefore, when wind blows from the left, the left gate flap has the biggest moment and the blades obtain the biggest moment. The moments at other positions are smaller. Once blades are selected, the drag coefficients of both sides of blades are fixed. Therefore, the difference between work done in the rotor's left and right half circumferences decreases with the increase of rotor's rotational speed, i.e., the efficiency of drag-type rotor decreases with the increase of the rotor's rotational speed, which is opposite to the lift-type rotor.

Figure 1:
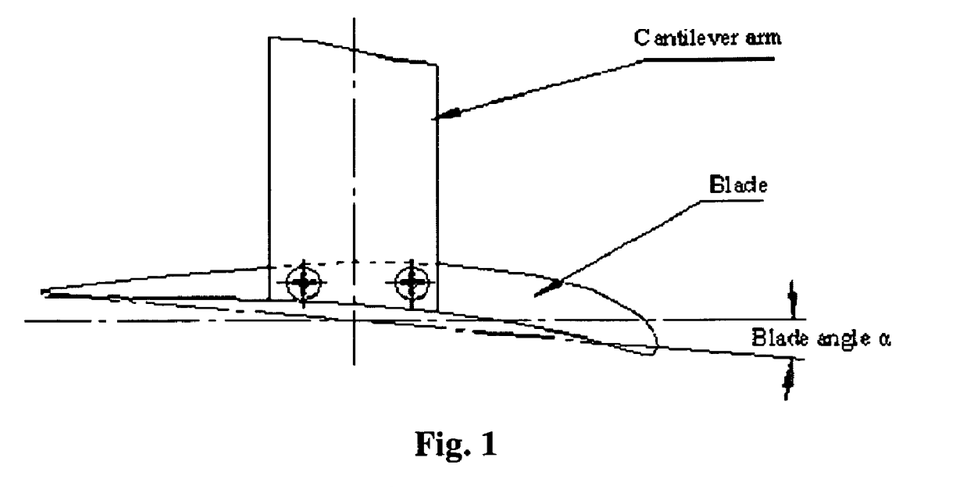
FIG. 1 is a schematic diagram illustrating fixing and mounting of blades using conventional technology.

Generally speaking, the wind rotor of a vertical axis wind turbine is composed of wing-shaped straight blades. The axial line of the blades is parallel to vertical axis. The wing shape of the blades can designed according to the current principles of aerodynamics. According to the principles of aerodynamics, the connecting line between the front and rear edges of blades is called the chord line and the rotating angle between blade's chord line and the tangent of the position on the circumference is set as rotating angle $\alpha$. Normally, the blades are fixed on the cantilever support wing (cantilever support) or ring-type support rotating around vertical axis and cannot rotate relative to the cantilever support wing. That is to say that that blade rotating angle $\alpha$ is fixed and unchanged, as shown in FIG. 1. When strong enough wind blows over these straight blades that are wing-shaped and form a specific angle with the tangent of the rotating axis, a moment of rotation around the vertical axis is produced sufficient to rotate the entire wind rotor.

Figure 4:
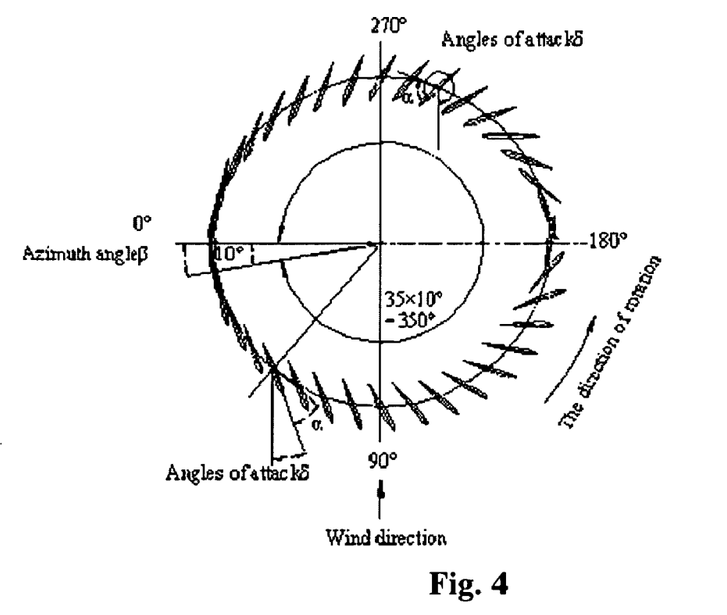
FIG. 4 is a schematic diagram illustrating the azimuth angle, the blade rotating angle and the angle of attack as defined for this invention.

According to the principles of aerodynamics, the rotating angle between the chord line formed by connecting the centers of blades' front and rear edges and the wind direction is called the angle of attack $\delta$, as shown in FIG. 4. Because the position of each blade in the circumference changes continuously, the blade's angle of attack changes accordingly during rotation. When a blade is at different positions during rotation, the size and direction of the driving moment produced by the blade continually changes due to changes in the blade's angle of attack, i.e., the produced moment of rotation is different. At certain positions, a larger driving moment is produced; at other positions, a smaller driving moment is produced. At certain positions, a large or small moment of resistance is produced. In conventional solutions, when a blade is at different positions during rotation, the blade rotating angle α is fixed and unchanged, while the size and direction of the driving moment produced by the blade constantly change. Therefore, it is unavoidable that conventionally blades are fixed on the wind rotor's cantilever support wing. This is an important factor affecting the utilization efficiency of the vertical axis wind turbine.

SUMMARY OF THE INVENTION

This invention relates to a lift-type rotor. Taking into consideration the deficiency of the above existing technology, this invention overcomes the design defects of existing vertical axis wind turbine and puts forth an angle-of-attack adjusting device for blades which can effectively lower the starting wind speed of vertical axis wind turbine and increase its wind energy utilization ratio by adjusting the angle of attack of the blades.

According to principles of aerodynamics, as shown in FIG. 4, the connecting line between the blade's front and rear edges is called the chord line and the rotating angle between the blade's chord line and the tangent of the position in the circumference is set as the rotating angle α. When the blade's chord line is parallel to the tangent, the rotating angle α is zero. When a blade rotates clockwise around its centre of gyration, the rotating angle α is by convention positive. When the blade rotates anti-clockwise around its centre of gyration, the rotating angle α is by convention negative. The rotating angle between the chord line and the wind direction is called the angle of attack δ. As shown in FIG. 4, the azimuth angle of a wing-shaped blade at any relative position in the circumference is defined as β, i.e., the range of β is from 0 to 360 degrees. According to the principles of aerodynamics, in order for the blade to produce a driving moment, there must be one best angle of attack between the blade and the wind direction, at which the blade can produce the maximum driving moment. This best angle of attack can be determined in a wind tunnel test. Therefore, when a blade rotates around the vertical axis, its angle of attack δ is always kept optimal by adjusting its rotating angle α at different azimuth angle β in the circumference, thus maximally increasing the wind energy utilization ratio of a vertical axis wind turbine.

The specific technical scheme of this invention is described below.

An angle-of-attack adjusting device for blades of a vertical axis wind turbine comprises vertical rotating axis, rotatable cantilever support wing fixed on the rotating axis, and a wind rotor comprising a plurality of blades mounted on the cantilever support wing. The device has the following characteristics:

At least one cam is set up along the axial direction of the rotating axis. The axial direction of cam is parallel to rotating axis. For any point in the contour line, the angle of attack (δ)=the azimuth angle (β)−the rotating angle (α).

Each blade can rotate relative to the connected cantilever support wing.

The driving device is connected to the cam and blades.

In order for each blade to get the optimum driving moment at each position of circumference, the contour curve of cam is set according to the principles of aerodynamics and on the basis of the following equation for any point in the contour line of cam:

angle of attack (δ)=azimuth angle (β)−rotating angle (α).

That is to say that the contour line of the cam is designed on the basis of a different angle of attack δ for a different azimuth angle β.

The relations among azimuth angle β, rotating angle α and angle of attack δ are given below:

| Azimuth angle β | 10° | 20° | 30° | 40° | 50° | 60° | 70° | 80° | 90° |
|---|---|---|---|---|---|---|---|---|---|
| Angle of attack δ | 20° to 0° | 20° to 0° | 30° to 0° | 40° to 10° | 40° to 10° | 50° to 20° | 60° to 30° | 60° to 30° | 30° to 10° |
| Blade rotating angle α | −10° to 10° | 0° to 20° | 0° to 30° | 0° to 30° | 10° to 40° | 10° to 40° | 10° to 40° | 20° to 50° | 60° to 80° |
| Azimuth angle β | 100° | 110° | 120° | 130° | 140° | 150° | 160° | 170° | 180° |
| Angle of attack δ | 60° to 30° | 80° to 50° | 100° to 70° | 110° to 80° | 120° to 100° | 140° to 120° | 150° to 130° | 160° to 140° | 190° to 170° |
| Blade rotating angle α | 40° to 70° | 30° to 60° | 20° to 50° | 20° to 50° | 20° to 40° | 10° to 30° | 10° to 30° | 10° to 30° | −10° to 10° |
| Azimuth angle β | 190° | 200° | 210° | 220° | 230° | 240° | 250° | 260° | 270° |
| Angle of attack δ | 190° to 220° | 200° to 230° | 220° to 240° | 240° to 260° | 250° to 270° | 270° to 290° | 280° to 300° | 280° to 300° | 290° to 310° |
| Blade rotating angle α | 0° to −30° | 0° to −30° | −10° to −30° | −20° to −40° | −20° to −40° | −30° to −50° | −30° to −50° | −20° to −40° | −20° to −40° |
| Azimuth angle β | 280° | 290° | 300° | 310° | 320° | 330° | 340° | 350° | 360° |
| Angle of attack δ | 300° to 320° | 300° to 320° | 310° to 330° | 320° to 340° | 320° to 350° | 330° to 350° | 340° to 360° | 360° to 350° | 370° to 360° |
| Blade rotating angle α | −20° to −40° | −10° to −30° | −10° to −30° | −10° to −30° | 0° to −30° | 0° to −20° | 0° to −20° | −10° to 0° | −10° to 0° |

The rotating axis of each blade can rotate horizontally relative to the connected cantilever support wing.

The best range of the blade rotating angle α is ±60 degrees.

In order for the blade to reduce energy consumption during rotation, the center of the blade's rotating axis is set at the center of the chord line.

The central axis of the cam coincides with rotating axis and the cam is disposed outside the rotating axis.

The central axis of the cam coincides with the rotating axis and the cam is inside the rotating axis.

A groove is made along the circumference for the cam.

The driving device comprises a guide bar mechanism and a slider mechanism.

The driving device comprises a guide bar mechanism and a slider mechanism. The guide bar and the crank are connected through a connecting bar.

The rotating axis of each blade is fixed on the crank and connected with the cantilever support wing. A bearing is mounted on the wind rotor's cantilever support wing. The guide bar of the cam mechanism can reciprocate along cam's contour curve together with the bearing. Thus, the slider mechanism connected to the guide bar always maintains a set angle of attack range when blades rotate together with the cantilever support wing.

The bearing is a linear bearing or a spherical bearing.

The cam is a grooved cam. The shape of the groove is that of the cam's contour line.

The guide bar of the cam mechanism can reciprocate along the cam's contour curve together with the bearing. Through the connecting bar connected to the guide bar, the slider mechanism connected to connecting bar always maintains the set angle of attack range when the blades rotate together with the cantilever support wing.

A reasonable angle is set between the blade's chord line and the crank's rotating angle in order to avoid the collinearity of the blade's chord line and the crank.

The driving device comprises a gear and a gear rack. The gear and the gear rack are connected to the cam and the blade. Together with the gear and the gear rack, the grooved cam mechanism is used to adjust the blade's angle of attack. The optimized range of angle of attack ($\delta$) is the set range for the grooved cam mechanism to work with the slider mechanism.

Under strong enough wind, the guide bar of the grooved cam mechanism rotates with the cantilever support wing. The roller at one end of guide bar moves along the static cam contour line, thus causing the guide bar to reciprocate. The other end of the guide bar is fixed with the slider mechanism. In fact, the guide bar is the slider of the slider mechanism. Because the blade is connected to the crank, the guide bar's motion drives the crank to rotate, realizing the rotation of the blade relative to the support. Therefore, the blade's angle of attack can be within the set ranges when the blade is at different positions on the circumference. When the wind direction changes, the motor drives the grooved cam to rotate by a corresponding angle, keeping the relative orientation between the wind direction and the grooved cam unchanged. Thus, when the wind direction changes, the blade's angle of attack is still within the set ranges.

Figure 2:
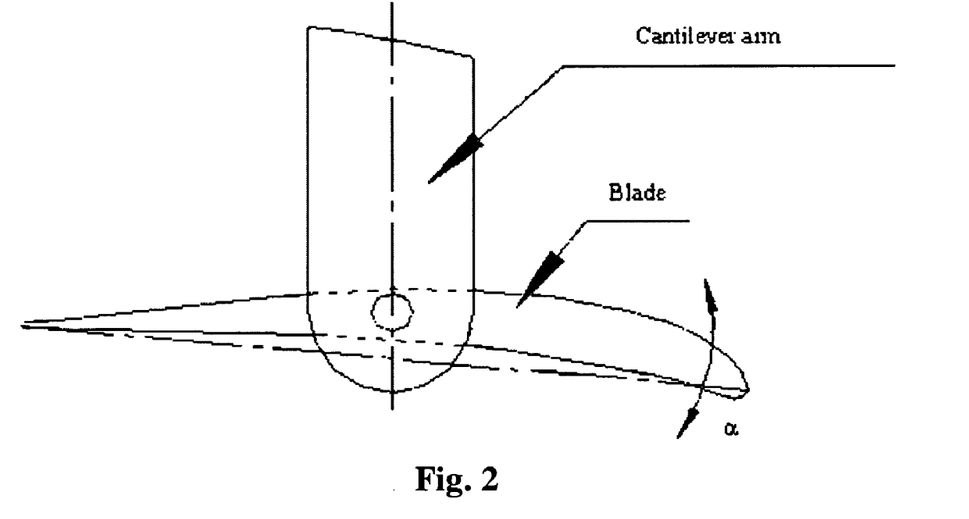
FIG. 2 is a schematic diagram illustrating fixing and mounting of blades according to one embodiment of this invention.

The device of this invention can be used to adjust the blade's angle of attack, so that the blade can rotate in a controlled way relative to the cantilever support wing. As shown in FIG. 2, the rotating angle $\alpha$ can be adjusted, so the blade's angle of attack $\delta$ relative to the wind direction can always be within the set range. In this way, when a blade is at any position on the circumference, i.e., an azimuth angle $\beta$ of 0-360 degrees, no moment of resistance, but moment of rotation, is produced, thus increasing the wind energy utilization ratio of the vertical axis wind turbine.

When the wind speed is higher than a set value, the grooved cam can be rotated to change the angle of attack $\delta$ in order to ensure that the wind rotor outputs power at a constant rotation speed.

When the wind direction does not change, the device for this invention automatically adjusts the rotating angle $\alpha$ between the blade and the chord line depending on the different positions of the blade during the wind rotor's rotation, i.e., the angle of attack $\delta$ between the blade and the wind direction is adjusted to an optimal range. When the wind direction changes, the wind rotor (i.e., cam's azimuth angle $\beta$) is adjusted accordingly so that the direction of the device for this invention relative to the wind direction keeps unchanged and the blade's angle of attack remains within the optimized range.

Compared with wind turbines adopting conventional technology (i.e., wherein each blade has a fixed rotating angle), the device for this invention can guarantee that the blades' angles of attack for different positions on the circumference are within optimized ranges so that the blades can produce a driving moment at different positions, thus increasing the wind energy utilization ratio.

In a static state, under the same blade conditions, the torque of the wind rotor with a variable angle of attack is 2.4 to 5.4 times that of the wind rotor with a fixed angle of attack, so the starting wind speed of vertical axis wind turbine is effectively lowered. When the wind rotor rotates, the result of test and calculation shows that under the same blade conditions, the wind energy utilization ratio of vertical axis for variable angle of attack is 1.14 to 3.1 times that for the fixed angle of attack.

During rotation, the blade angle-of-attack adjusting device for this invention does not require any extra energy consumption except for some energy consumption required to adjust wind rotor's position by starting motor to adapt to the wind direction change.

This invention will be described hereinbelow on the basis of attached drawings and the method of implementation.

DETAILED DESCRIPTION OF THE INVENTION

The following implementation examples give a further detailed description of this invention, but are not a limitation of this invention.

EXAMPLE 1

Figure 3:
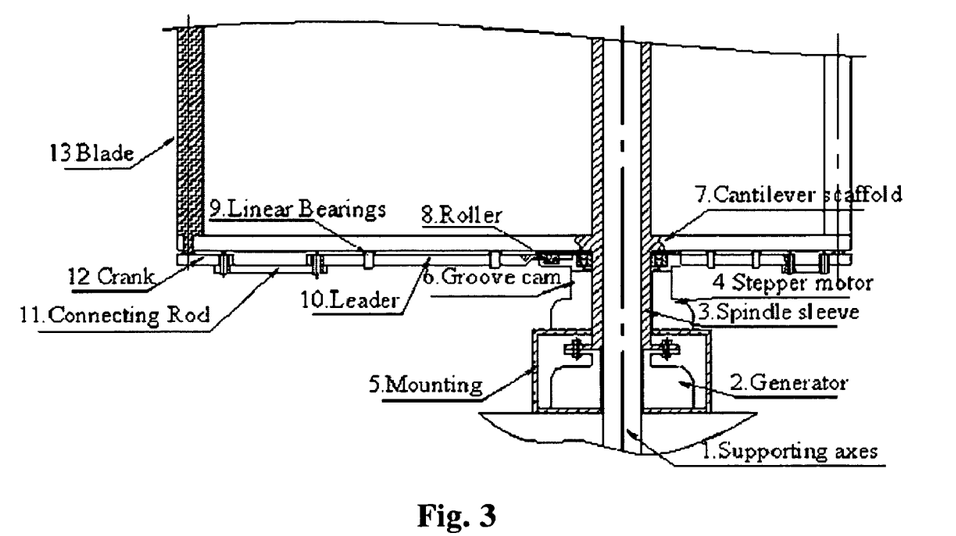
FIG. 3 is a cross-sectional diagram illustrating the device described in Example 1.

As shown in FIG. 3, the wind rotor of vertical axis wind turbine 2 is supported by the support frame 5. The support axis 1 is inside the vertical axis wind turbine 2. There is a spindle sleeve 3 outside the support axis 1. There are also a wind indicator, a step motor 4 and a control device for step motor. Wind indicator is used to inspect the change of the wind direction and provides wind direction signal to the control device for the step motor. Because the wind indicator of this device and the control device for the step motor are one part of the control device for the wind turbine, they are not shown in the figure. The step motor 4 adopts a hollow step motor for direct adjustment. The rotors of the motor are hollow so that wind rotor's spindle sleeve 3 can pass through. The step motor 4 is fixed on the fixed support below the step motor. The flange on its rotor is connected to grooved cam 6, so it can drive the grooved cam to rotate.

In this example, the blade angle-of-attack adjusting device comprises a wind rotor comprising a plurality of blades 13, a grooved cam 6, a guide bar mechanism, and a slider mechanism. A linear bearing 9 is mounted on a cantilever support 7 of the wind rotor. The linear bearing roller 8 at one end of the guide bar 10 of grooved cam mechanism rolls in the contour line groove of grooved cam 6. The guide bar 10 and the crank 12 are connected through the connecting bar 11. The blade's rotating axis is fixed on the crank 12 and connected to the cantilever support 7. The slider of the slider mechanism is in fact the guide bar 10 of the guide bar mechanism of the grooved cam 6. The guide bar reciprocates under the action of the contour curve of the grooved cam 6, i.e., converting into the set rotating angle of crank 12. Thus, the blade 13 rotates relative to the cantilever support 7, maintaining the blade's angle at a preset value.

In this device, each blade can rotate relative to the connected cantilever support. On the cantilever support, each blade can rotate around the rotating axis. When the blade rotates at different positions, the blade's angle of attack δ can be automatically adjusted to make the blade's angle of attack δ for any position on the circumference always within the predetermined angle range shown below:

A reasonable angle is set between the blade's chord line and the crank's rotating angle in order to avoid collinearity of the blade's chord line and the crank. That is to say that in order to avoid the collinearity of crank 12 and connecting bar 11 as well as a dead point that may be caused by slider mechanism, a reasonable angle is set between the chord line of the blade 13 and the rotating angle of the crank 12. For example, 20 degrees may be set and then the rotating range of blade 13 is within ±60 degrees.

When the wind rotor rotates around the vertical axis under the wind force, on one hand, the guide bar 10 rotates around the vertical axis under the driving of the cantilever support 7; on the other hand, the roller 8 on the guide bar 10 moves along the cam's contour curve in the groove of the grooved cam 4. The contour curve of the grooved cam 4 decides the travel path of reciprocation of the guide bar in the linear bearing 9. The driving force of reciprocation is produced by squeezing of the roller 8 at one end of the guide bar 10 and the contour of grooved cam when the cantilever support 7 drives the guide

| Azimuth angle β | 10° | 20° | 30° | 40° | 50° | 60° | 70° | 80° | 90° |
|---|---|---|---|---|---|---|---|---|---|
| Angle of attack δ | 20° to 0° | 20° to 0° | 30° to 0° | 40° to 10° | 40° to 10° | 50° to 20° | 60° to 30° | 60° to 30° | 30° to 10° |
| Blade rotating angle α | −10° to 10° | 0° to 20° | 0° to 30° | 0° to 30° | 10° to 40° | 10° to 40° | 10° to 40° | 20° to 50° | 60° to 80° |
| Azimuth angle β | 100° | 110° | 120° | 130° | 140° | 150° | 160° | 170° | 180° |
| Angle of attack δ | 60° to 30° | 80° to 50° | 100° to 70° | 110° to 80° | 120° to 100° | 140° to 120° | 150° to 130° | 160° to 140° | 190° to 170° |
| Blade rotating angle α | 40° to 70° | 30° to 60° | 20° to 50° | 20° to 50° | 20° to 40° | 10° to 30° | 10° to 30° | 10° to 30° | −10° to 10° |
| Azimuth angle β | 190° | 200° | 210° | 220° | 230° | 240° | 250° | 260° | 270° |
| Angle of attack δ | 190° to 220° | 200° to 230° | 220° to 240° | 240° to 260° | 250° to 270° | 270° to 290° | 280° to 300° | 280° to 300° | 290° to 310° |
| Blade rotating angle α | 0° to −30° | 0° to −30° | −10° to −30° | −20° to −40° | −20° to −40° | −30° to −50° | −30° to −50° | −20° to −40° | −20° to −40° |
| Azimuth angle β | 280° | 290° | 300° | 310° | 320° | 330° | 340° | 350° | 360° |
| Angle of attack δ | 300° to 320° | 300° to 320° | 310° to 330° | 320° to 340° | 320° to 350° | 330° to 350° | 340° to 360° | 360° to 350° | 370° to 360° |
| Blade rotating angle α | −20° to −40° | −10° to −30° | −10° to −30° | −10° to −30° | 0° to −30° | 0° to −20° | 0° to −20° | −10° to 0° | −10° to 0° |

Figure 5:
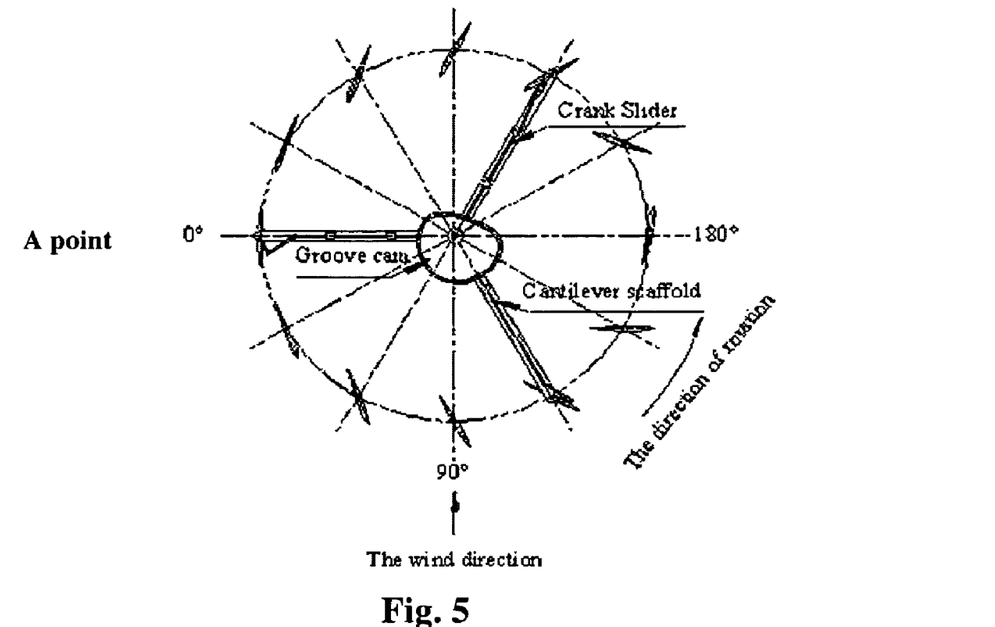
FIG. 5 is a rotation diagram of the wind rotor according to one embodiment of this invention.
Figure 6:
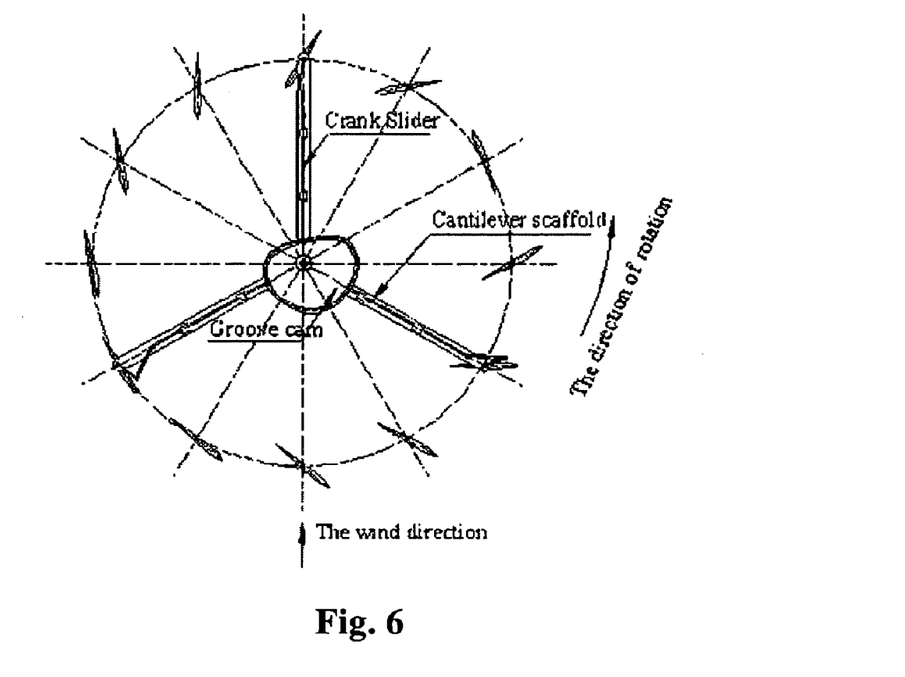
FIG. 6 is a rotation diagram of the wind rotor according to one embodiment of this invention.
Figure 7:
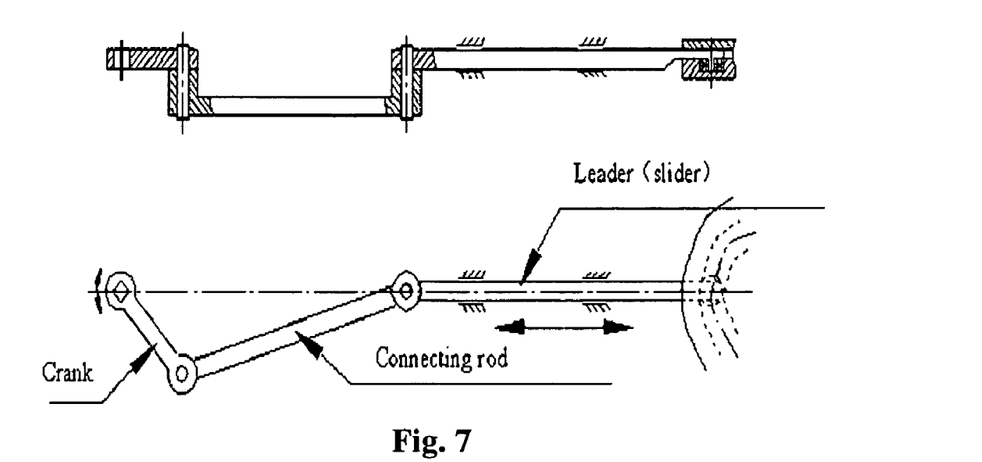
FIG. 7 is a structural diagram of the crank slider according to Example 1 of this invention.
Figure 9:
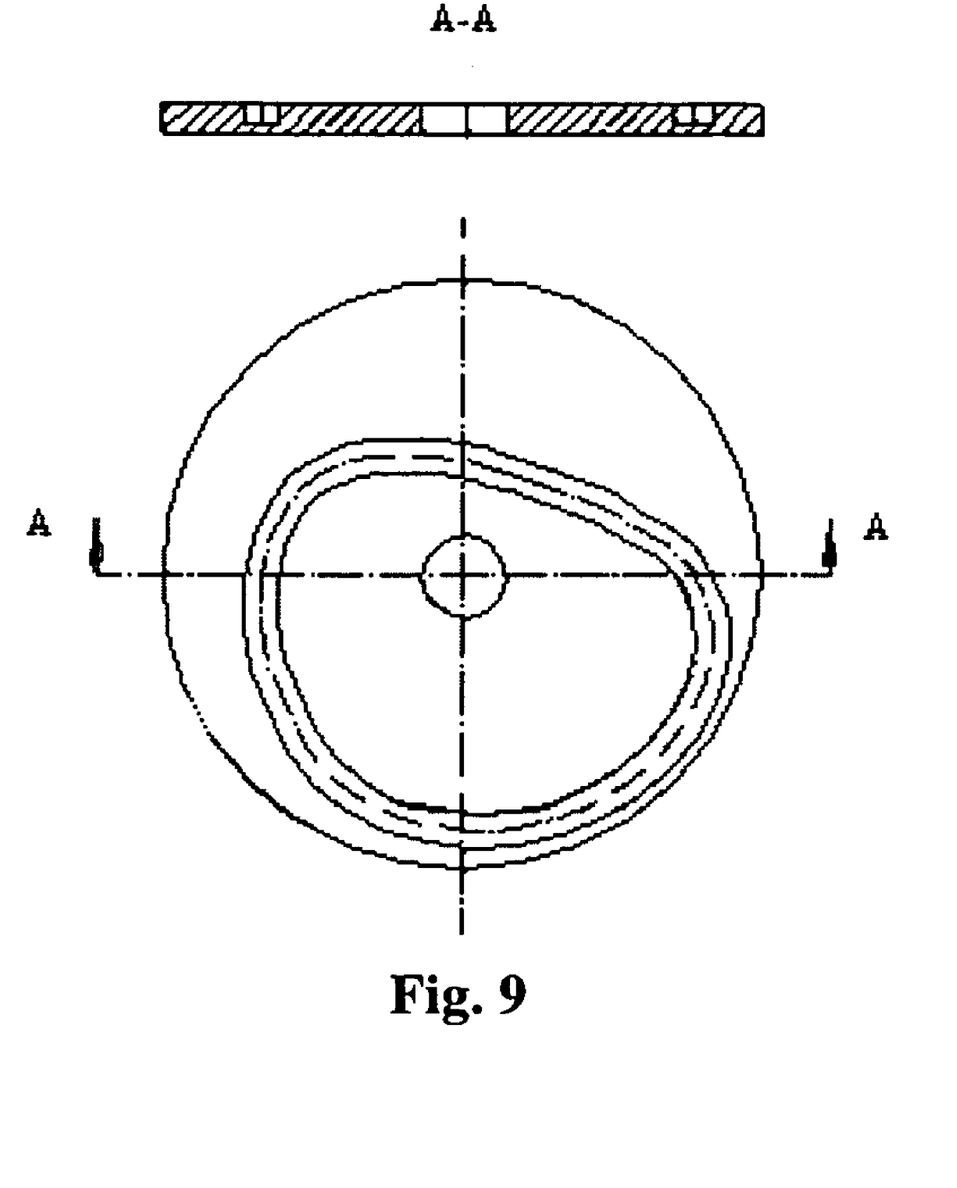
FIG. 9 is a structural diagram of the cam according to one embodiment of this invention.

The adjustment of the angle of attack when a blade is at different positions on the circumference is at the core of this invention. The grooved cam mechanism, as shown in FIG. 9, is used to adjust the angle of attack of the blades. The grooved cam mechanism is composed of a grooved cam and a guide bar 10. As shown in FIGS. 5 and 6, the cam of the grooved cam mechanism is a planar grooved cam. The shape of the groove is that of the cam's contour line. According to the principles of aerodynamics, the cam's contour line is set on the basis of the following equation: angle of attack (δ)=azimuth angle (β)−rotating angle (α) for any point at the cam's contour line, i.e., the cam's contour line is designed by setting different angles of attack δ when the blade has different azimuth angles β. The grooved cam 6 is connected with the rotors of the step motor 4. When the wind direction does not change, the grooved cam 6 keeps position unchanged. When wind direction has a larger change (i.e., the wind energy utilization ratio or the output power of wind turbine are affected), the step motor 4 adjusts the azimuth angle β of the grooved cam 6. The guide bar 10 of the grooved cam mechanism is mounted in the linear bearing 9 of the cantilever support 7. A roller 8 is mounted at one end of the guide bar 10 and the other end is connected to the connecting bar 11. As shown in FIGS. 3 and 7, the guide bar 10 of the grooved cam mechanism is in fact also the slider of the slider mechanism. The roller 8 of the guide bar 10 is embedded in the groove of the grooved cam 6 and can move along the groove. The cam's contour curve on both sides of the groove makes the guide bar 10 move at a preset angle.

bar 10 to rotate. Because the guide bar 10 of the cam mechanism is the slider of the slider mechanism, its reciprocation drives the crank 12 to rotate and the crank 12 is connected with the blade 13, the angle of attack δ when the blade is at different positions is always within the preset angle range.

The control device for the step motor judges according to the signal of the wind indicator whether rotation is needed. When the wind direction does not change, the step motor 4 does not rotate. When the wind direction changes (depending on the precision of wind indicator, normally at least 3-5 degrees), it is needed to adjust the cam's azimuth angle according to the change of the wind direction. The step motor drives the grooved cam 6 to rotate, realizing the adjustment of direction of the grooved cam and keeping the relative position of the wind direction and the grooved cam 6 unchanged. Then, motor stops running until wind direction changes again.

As far as the whole process is concerned, when the wind direction does not change, the contour curve of the grooved cam 6 can guarantee that during the rotation of wind rotor, the angle of attack δ between the blade 13 and the wind direction is maintained within a preset range. The driving force of the blade rotation comes from the squeezing the roller at one end of guide bar and the contour curve of grooved cam and no extra power is required. When wind direction changes, in order to offset this change, step motor 4 is started to drive the grooved cam 6 to rotate by a corresponding angle so that the relative direction of wind and the grooved cam 6 always remains unchanged. Therefore, for the whole device, electric energy consumption is required only when wind direction has a larger change, i.e., when the angle between the central line of the grooved cam and the wind direction needs to be adjusted. Otherwise, blade 13 is adjusted through the contour curve of grooved cam, without the need to consume electric energy. When the change of wind direction is very small (normally less than 3-5 degrees), this device does not consume electric energy.

When wind speed is above a preset value (normally 15 m/s), the angle of attack δ can be changed by rotating the grooved cam 6, as shown in FIGS. 5 and 6. A point in the grooved cam 6 is rotated to a position where the azimuth angle β is above 0 degrees. The higher wind speed, the bigger the angle of rotation. In this way, the wind rotor can maintain optimal power output at a constant speed of rotation.

EXAMPLE 2

Figure 8:
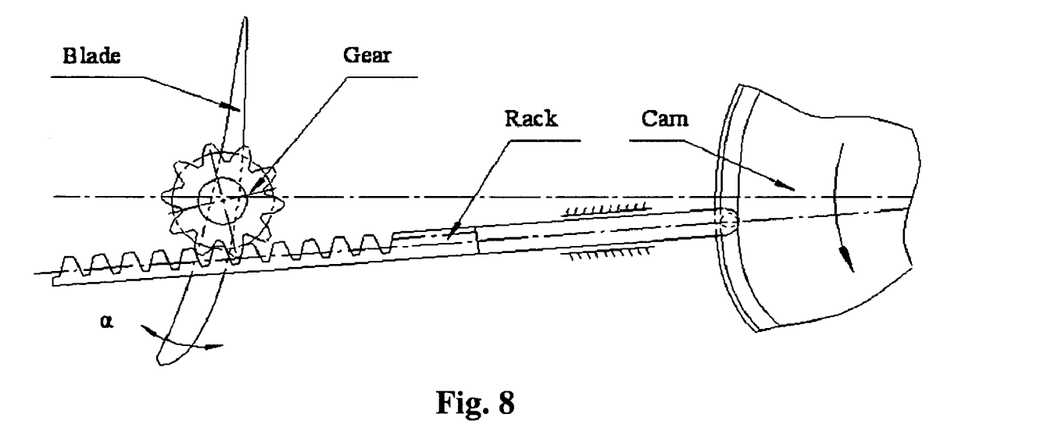
FIG. 8 is a structural diagram of the gear and gear rack according to Example 2 of this invention.

As shown in FIG. 8, the gear and the gear rack are connected to the cam and blades. Other devices are the same as those in Example 1. The bar mechanism and the slider mechanism are replaced with gear and the gear rack structure as the driving device. The grooved cam mechanism realizes the adjustment of the blade's angle of attack together with the gear and the gear rack. The optimized range of angle of attack δ is the same as that when a grooved cam mechanism is used together with a slider mechanism.

This invention is not to be limited to the specific embodiments disclosed herein and modifications for various applications and other embodiments are intended to be included within the scope of the appended claims. While this invention has been described in connection with particular examples thereof, the true scope of the invention should not be so limited since other modifications will become apparent to the skilled practitioner upon a study of the drawings, specification, and following claims.

All publications and patent applications mentioned in this specification are indicative of the level of skill of those skilled in the art to which this invention pertains. All publications and patent applications mentioned in this specification are herein incorporated by reference to the same extent as if each individual publication or patent application mentioned in this specification was specifically and individually indicated to be incorporated by reference.

What is claimed is:

1. A method for adjusting an angle-of-attack (δ) of blades in a lift-type vertical axis turbine comprising setting the angle of attack (δ) according to the following formula: δ=β−α, wherein δ is the angle of attack;
β is an azimuth angle;
α is a rotating angle for blades; and
δ, β, and α are as listed below:

| Azimuth angle β | 10° | 20° | 30° | 40° | 50° | 60° | 70° | 80° | 90° |
|---|---|---|---|---|---|---|---|---|---|
| Angle of attack δ | 20° to 0° | 20° to 0° | 30° to 0° | 40° to 10° | 40° to 10° | 50° to 20° | 60° to 30° | 60° to 30° | 30° to 10° |
| Blade rotating angle α | −10° to 10° | 0° to 20° | 0° to 30° | 0° to 30° | 10° to 40° | 10° to 40° | 10° to 40° | 20° to 50° | 60° to 80° |
| Azimuth angle β | 100° | 110° | 120° | 130° | 140° | 150° | 160° | 170° | 180° |
| Angle of attack δ | 60° to 30° | 80° to 50° | 100° to 70° | 110° to 80° | 120° to 100° | 140° to 120° | 150° to 130° | 160° to 140° | 190° to 170° |
| Blade rotating angle α | 40° to 70° | 30° to 60° | 20° to 50° | 20° to 50° | 20° to 40° | 10° to 30° | 10° to 30° | 10° to 30° | −10° to 10° |
| Azimuth angle β | 190° | 200° | 210° | 220° | 230° | 240° | 250° | 260° | 270° |
| Angle of attack δ | 190° to 220° | 200° to 230° | 220° to 240° | 240° to 260° | 250° to 270° | 270° to 290° | 280° to 300° | 280° to 300° | 290° to 310° |
| Blade rotating angle α | 0° to −30° | 0° to −30° | −10° to −30° | −20° to −40° | −20° to −40° | −30° to −50° | −30° to −50° | −20° to −40° | −20° to −40° |
| Azimuth angle β | 280° | 290° | 300° | 310° | 320° | 330° | 340° | 350° | 360° |
| Angle of attack δ | 300° to 320° | 300° to 320° | 310° to 330° | 320° to 340° | 320° to 350° | 330° to 350° | 340° to 360° | 360° to 350° | 370° to 360° |
| Blade rotating angle α | −20° to −40° | −10° to −30° | −10° to −30° | −10° to −30° | 0° to −30° | 0° to −20° | 0° to −20° | −10° to 0° | −10° to 0°. |

2. A device for adjusting an angle-of-attack (δ) of blades in a lift-type vertical axis turbine comprising a vertical rotating axis, a rotatable cantilever support wing fixed on said vertical rotating axis, a wind rotor comprising a plurality of blades mounted on said cantilever support wing, at least one cam disposed along an axial direction of said vertical rotating axis, the axial direction of the cam being parallel to the rotating axis, and for any point in a contour line of said cam, the angle of attack δ being set according to the following formula: δ=β−α, wherein δ is the angle of attack; β is an azimuth angle; α is a rotating angle for blades; and δ, β, and α are as listed below:

-continued

| Azimuth angle β | 280° | 290° | 300° | 310° | 320° | 330° | 340° | 350° | 360° |
|---|---|---|---|---|---|---|---|---|---|
| Angle of attack δ | 300° to 320° | 300° to 320° | 310° to 330° | 320° to 340° | 320° to 350° | 330° to 350° | 340° to 360° | 360° to 350° | 370° to 360° |
| Blade rotating angle α | −20° to −40° | −10° to −30° | −10° to −30° | −10° to−30° | 0° to −30° | 0° to −20° | 0° to −20° | −10° to 0° | −10° to 0° |

3. The device of claim 2, wherein the rotating axis of each blade is rotatable horizontally relative to the connected cantilever support wing.

4. The device of claim 2, wherein an optimum range of the blade rotating angle α is ±60 degrees.

* * * * *